United States Patent Office 3,376,925
Patented Apr. 9, 1968

3,376,925
PROCESS FOR THE USE OF EMULSIONS IN PETROLEUM RECOVERY
Claude P. Coppel, Woburn, Mass., assignor to Marathon Oil Company, Findlay, Ohio, a corporation of Ohio
No Drawing. Continuation-in-part of application Ser. No. 235,139, Nov. 2, 1962. This application Nov. 18, 1963, Ser. No. 324,182
2 Claims. (Cl. 166—9)

This application is a continuation-in-part of my United States patent application Ser. No. 235,139 filed Nov. 2, 1962, and titled, "Process and Compositions for the Use of Emulsions in Petroleum Recovery," which expired Dec. 20, 1963, and is now abandoned.

This invention relates to the recovery of petroleum fluids from permeable oil-bearing subterranean formations and more particularly to the use of emulsions in oil recovery.

Many secondary oil recovery techniques have been evolved through the years. Initially, water was injected to a formation via one well and used to push oil into the vicinity of a second well through which it was recovered. Although many other procedures have been evolved, this simple water flooding technique is still the secondary recovery process of choice. This state of affairs exists because the cost and sweep efficiency of the flood material govern its acceptance by the oil industry.

The efficiency of an oil recovery process is determined by the amount of oil recovered in flooding operations compared to the amount of oil in the formation at the time flooding is initiated. To have a good efficiency, the flooding media should have a viscosity, at least at its leading edge, greater than that of the crude being displaced; the flood material should preferentially displace the oil from the surface of the formation; and should be of a higher viscosity than that of the crude in the formation.

The viscosity of water floods has been improved by the addition of sugars, dextrans, carboxymethyl cellulose, amines, and various polymers to a portion of the flooding water. The ability of the water flood to displace preferentially petroleum from the formation has been enhanced by additives such as sodium hydroxide, colloidal sulfonates, carbon dioxide, hydrogen sulfide, mixtures of water soluble organic acids or alcohols and alkylaryl sulfonates. Many of these same additives, together with other gases and surfactants, have been used to reduce formation crude viscosity.

While the use of additives in a water flood has proved helpful, really high recovery efficiencies proved elusive, so a second type of technique evolved. This technique involved injecting into the formation a bank of a material miscible with the formation, for example, propane or butane, and driving the bank with nitrogen or other inert gas. Later water was used to drive a series of banks using, first, an oil-miscible component and, secondly, a hydrocarbon gas. Alternately, natural gas was used to drive a series of mixtures of petroleum and light hydrocarbons.

A high viscosity mixture has been suggested for use at the crude-bank material interface. Subsequent mixtures contained progressively larger amounts of light hydrocarbons to incrementally reduce the viscosity of the mixture to that of natural gas.

Other procedures utilizing alcohols, petroleum fractions and the like are also used to establish a viscosity and miscibility continuum from that of the crude to that of the drive material.

The use of bank materials appreciably increased the unit displacement efficiency but, as in the case of additives, often increased recovery costs to the extent that the operator found it more profitable to utilize substantially pure water as the flooding material.

I have now discovered that emulsions can be utilized as an easily recoverable bank which gives high recovery efficiencies.

While the emulsions utilized in the process of my invention are not miscible with either the crude in the formation or the drive material, the preferred oil-external emulsions have desirable properties which render them compatible with both. Through use of an emulsion, the viscosity of the bank material can be graduated from a high viscosity at the leading edge of the bank to a low viscosity at the trailing edge of the bank. The emulsion can be incrementally varied from a water-in-oil type emulsion at the leading edge of the bank to an oil-in-water type emulsion at the trailing edge of the bank to increase the compatibility of the bank with the crude and drive materials. The emulsions can be reworked for further use or can be fractionated to recover a major emulsion constituent with relative ease.

Essentially, the process of this invention comprises injecting a slug of an emulsion into a permeable subterranean formation containing petroleum fluids via one or more injection wells and thereafter injecting a drive material, preferably water, into the formation. The petroleum is recovered from the formation via one or more production wells as the crude is displaced by the bank material. The bank can be recovered or abandoned as desired.

Emulsions utilized in my process are mobile and stable to the ions and fluids in the formation; i.e., they do not break in the presence of these materials. These emulsions can contain additives to insure optimum operations; for example, corrosion inhibitors can be used in sour fields and bactericides used where necessary. The emulsions are made up of two substantially immiscible materials and an emulsifier. Usually one of these materials is polar and the other nonpolar. Among the nonpolar materials useful in my invention are included aliphatic and aromatic hydrocarbons and mixtures thereof, such as mineral oils. Petroleum crudes and fractions thereof are preferred.

Water is the preferred polar material immiscible with the nonpolar material.

Surfactants, emulsifying agents, useful in forming the various emulsions useful in my process are nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyldiethyleneglycol sulfate, monobutylphenyl phenol sodium sulfate, and triethanolamine laurate or triethanolamine oleate or polyethylene glycol monolaurates or myristates. Where a petroleum hydrocarbon-water emulsion is to be used, I prefer to utilize anionic surfactants such as higher alkylaryl monosulfonates, particularly alkylnaphthyl monosulfonates, wherein the alkyl radical contains from about 10 to 20 carbon atoms. The sodium salts of dialkylsuccinates are also particularly desirable surfactants for use in making up my bank materials. It is preferred that the alkyl radicals of the succinate compounds contain from about 6 to about 10 carbon atoms.

Emulsions utilizing chlorinated solvents as the nonpolar phase are preferentially prepared utilizing a nonionic surfactant such as the sodium sulfate derivative of 3,9-diethyltridecanol-6 or the sodium sulfate derivative of 7-ethyl-2-methylundecanol-4. Amine emulsifiers, for example, 1-hydroxyethyl-2-heptadecenyl glyoxalidine, are preferred where the water in the formation is acidic or contains relatively large amounts of calcium or heavy metal ions.

The type of surfactant utilized depends upon the temperature of the formation and the hardness, including salinity, and pH of the connate water and the water used to make up the bank material. It would be futile to use a detergent such as sodium oleate in a formation containing relatively high concentrations of calcium and magnesium ions, as the precipitated calcium and magnesium soaps would plug the formation. Similarly, where there is a natural detergent in the crude, the flooding emulsion must contain a surfactant having a similar ionic charge and be otherwise compatible to avoid precipitating an insoluble reaction product.

The water utilized in preparing my bank materials is preferably soft. However, ordinary hard tap water and even relatively brackish waters can be used with detergents which are stable to the contaminating ions. The water utilized can be of a class designed to overcome problems arising out of the water sensivity of a particular formation. Thus, if flooding is carried out in a Berea sandstone, brackish water must be used to make up the emulsion.

The emulsions used in this invention are prepared according to the methods generally used by industry to prepare any other emulsions, such as cutting oils; metal and floor polishes; paper and textile sizes; and dressings and polishes for leather, furniture, and automobiles. Essentially the process consists of dissolving the emulsifier in one or both of the immiscible materials which are to make up the emulsion. One material is incrementally stirred into the other material to make up the emulsion.

The emulsion used in this invention can be broken. This fact can be utilized to advantage if it is desired to recover the petroleum fraction of the emulsion. For example, where a salt-sensitive surfactant is utilized, saline water can be added to the emulsion and the petroleum fraction recovered when the solutions separates into two phases. Where the petroleum fraction is to be recovered, it is often preferable to utilize a predominately water-soluble surfactant in the preparation of the emulsion due to the better ionization of the surfactant and other compounds in this medium.

Where surfactant sensitive to the ions in the connate water or the drive water are used, a slug of substantially pure water can be used to insulate the bank from the high ion content water.

It is difficult to define the exact amount of bank material required in my process. Ideally, sufficient bank material should be used to provide a substantially continuous zone of bank material, at the perimeter of the area from which it is desired to recover petroleum crude, between the crude in the formation and the material used to drive the bank. Sometimes it may be more economical to use a small slug, expecting substantial breaks in the bank at the final perimeter, to obtain only a partial recovery of crude rather than to use a large slug and obtain a complete recovery in the swept area. The amount of bank required will also vary with the area to be swept. As is known, the amount of slug used increases, though the percent pore volume decreases, with the volume of reservoir to be swept. Crude viscosity, substantial variations in formation permeability, and other considerations also affect the pore volume to be used. Thus, increased amounts of bank material are required where the viscosity of the crude is high in order that the incremental drops in viscosity from the high viscosity at the leading edge to the low viscosity at the trailing edge will be small.

I prefer to inject into the formation a slug of bank material of at least about 3% to about 10% of the pore volume of the formation. Thirty percent, or more, bank material can be utilized. However, such large banks can prove economically unattractive.

The viscosity of the petroluem constituent determines the degree of viscosity of all compositions utilizing that constituent. Thus all compositions formed with a high viscosity petroleum constituent will have a higher viscosity than similar compositions containing a lighter crude.

The apparent viscosity of compositions containing a particular crude can be regulated by adjusting the amount of water in the composition. The viscosity of the compositions increases as water is added to a point. After that the further addition of water reduces the viscosity of the composition. For these reasons, the viscosity of the bank material can be varied from a high viscosity near the crude-bank interface to a low viscosity near the bank-water interface. It is preferred that the leading edge of the bank have an oil-external emulsion of high oil content, as the oil-external emulsions sorb both oil and water from the formation and tend to invert. Generally, the longer the oil-external emulsion remains intact, the higher are the recoveries obtained. During flooding operations, an oil bank builds up adjacent the oil-external slug and tends to act as a slug itself while protecting the leading edge of the first injected slug.

After injection of the bank is completed, a drive material is injected into the formation, usually through the same injection wells, to force the bank material through the formation and the crude ahead of the bank material. Water, which can contain high ion concentrations in water-sensitive formations, is the preferred drive material. Other drive materials are also useful. Examples of such materials include nitrogen, carbon dioxide, and natural gas.

The following specific examples more fully illustrate my invention, but it is not intended that my invention be limited to the exact petroleum constituents, surfactants, alcohols, or procedures utilized. Rather, it is intended that all equivalents obvious to those skilled in the art be included within the scope of my invention as claimed.

Example I

A series of 4 water-in-cetane emulsions were made up of 28.5 ml. cetane, 20 ml. water, 1.12 grams of Atpet 200 (a sorbitan partial fatty ester), and 0.38 gram of G3300 (an alkyl aryl sulfonate detergent). The detergents were dissolved in the cetane, and water was incrementally stirred into the cetane detergent mixture. The emulsion had a viscosity of 23–27 cp.

This emulsion was used to displace cetane (viscosity 3.34 cp.) from a saturated 1″ long x ¾″ diameter alundum core plug having a permeability of 300 md. The pressure drop across the plug was 1 p.s.i. These emulsions required 14.13, 15.0, 30.0, and 18.3 min. to pass through the plug and recovered 102.1, 105.4, 104.7, and 103.8% of displaced oil. The recovery values are thought to exceed 100% as a result of a small water enrichment of the emulsion phase left in the core plug.

Example II

In another set of experiments using Tip Top crude in an emulsion made of 25 ml. crude, 20 ml. water, 2 grams Atpet 200, and 3 grams of G3300, the results of the following table were obtained when cetane was displaced from a core having a pore volume of 10.3 ml.

TABLE 1

| Vol. of Emulsion (pore vol.) | Follow-up Fluid | Viscosity of Follow-up Fluid (cps.) | Vol. Cetane Displaced at 10.0 ml. Inject |
|---|---|---|---|
| 1.0 | | | 10.0 |
| 0.30 | H₂O-glycerin | 20.0 | 10.0 |
| 0.10 | H₂O-glycerin | 20.0 | 9.7 |

These tests indicate that the emulsion had the displacement efficiency of a miscible fluid at high slug volume (30% or greater) and performed almost as well at 10% slug volume.

Example III

Table 2 shows results of displacements carried out when a pore volume of cetane was displaced from an 11-inch sandstone core plug utilizing the emulsion of Example II as the displacing agent.

TABLE 2

| Ml. cetane displaced at 10 ml. emulsions injected: | Percent oil displaced at 1 core vol. |
|---|---|
| 9.6–9.8 | 96–98 |
| 9.7–9.8 | 97–98 |

Example IV

A core filled with Tip Top crude is readily swept with an emulsion utilizing the emulsion of Example II.

Example V

The following is an example of a flooding emulsion made from high salt content water. Dedrick crude oil (a sweet crude from the Illinois Basin) 58%; water containing 36,000 p.p.m. salt 40%; 2% of a 4.5:1 ratio of Tween 85 (a polyoxyethylene sorbitan trioleate manufactured by Atlas Powder Company); and a petroleum sulfonate surfactant (sold by Sonneborne Corp.).

Now having described my invention, what I claim is:

1. A process for the recovery of petroleum from permeable subterranean formations having a plurality of wells drilled therein comprising injecting into said formation through a portion of the wells an emulsion bank, said bank being a water-in-oil emulsion at the emulsion-petroleum interface and an oil-in-water emulsion at the emulsion-drive material interface; thereafter injecting water into the formation to displace the bank from its initial position within the formation and recovering petroleum from a second portion of the wells drilled into the formation.

2. In a process for the recovery of petroleum hydrocarbons from subterranean formations having at least one injection well and at least one production well drilled therein, the step comprising injecting into a permeable subterranean formation, through at least one injection well, from about 3 up to about 10% formation pore volume of a slug of an emulsion having an apparent viscosity which is about that of the crude in the formation at its leading edge and which incrementally decreases in apparent viscosity toward its trailing edge, injecting a drive medium into said formation and recovering displaced oil from said at least one production well.

References Cited

UNITED STATES PATENTS

| | | |
|---|---|---|
| 2,867,277 | 1/1959 | Weinaug et al. _____ 166—42 X |
| 2,988,142 | 6/1961 | Maly _____ 166—8 |
| 3,149,669 | 9/1964 | Binder, et al. _____ 166—9 |
| 3,208,515 | 9/1965 | Meadors _____ 166—9 |
| 3,208,517 | 9/1965 | Binder et al. _____ 166—9 |

OTHER REFERENCES

Slobod, R. L. et al. Use of a Graded Viscosity Zone to Reduce Fingering in Miscible Phase Displacements. In Producers Monthly, August 1960, pp. 12, 14, 15, 16, 18 and 19. TN 860. p. 7.

STEPHEN J. NOVOSAD, *Primary Examiner.*

CHARLES E. O'CONNELL, *Examiner.*

T. A. ZALENSKI, *Assistant Examiner.*